(12) United States Patent
Ohnuma (10) Patent No.: US 11,948,609 B2
(45) Date of Patent: Apr. 2, 2024

(54) BEARING APPARATUS HAVING INNER SHAFT MALE THREAD PART EXTENDING OUT FROM OUTER SHAFT OPENING TO ATTACH TO DISK DRIVE BASE

(71) Applicant: MINEBEA MITSUMI Inc., Nagano (JP)

(72) Inventor: Shinya Ohnuma, Nagano (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 18/297,814

(22) Filed: Apr. 10, 2023

(65) Prior Publication Data

US 2023/0335156 A1 Oct. 19, 2023

(30) Foreign Application Priority Data

Apr. 14, 2022 (JP) ................. 2022-066947

(51) Int. Cl.
| | |
|---|---|
| *G11B 5/55* | (2006.01) |
| *F16C 19/08* | (2006.01) |
| *F16C 19/54* | (2006.01) |
| *G11B 5/48* | (2006.01) |
| *G11B 5/54* | (2006.01) |
| *G11B 25/04* | (2006.01) |

(52) U.S. Cl.
CPC ............ *G11B 5/4813* (2013.01); *F16C 19/08* (2013.01); *F16C 19/54* (2013.01); *G11B 5/54* (2013.01); *G11B 5/55* (2013.01); *G11B 25/043* (2013.01); *F16C 2370/12* (2013.01); *F16C 2380/00* (2013.01)

(58) Field of Classification Search
None
See application file for complete search history.

(56) References Cited

U.S. PATENT DOCUMENTS

| | | | | |
|---|---|---|---|---|
| 5,099,374 | A * | 3/1992 | Ohkita et al. | G11B 5/5521 360/265.6 |
| 6,256,173 | B1 * | 7/2001 | Chee et al. | G11B 5/4813 360/265.6 |
| 7,280,317 | B1 * | 10/2007 | Little et al. | G11B 5/4813 360/265.6 |
| 2003/0156358 | A1 * | 8/2003 | Jeong | G11B 33/08 360/265.6 |
| 2005/0248886 | A1 * | 11/2005 | Culver | G11B 5/4813 360/265.6 |
| 2019/0348071 | A1 | 11/2019 | Shi et al. | |

* cited by examiner

Primary Examiner — Craig A. Renner
(74) Attorney, Agent, or Firm — Pearne & Gordon LLP (57) ABSTRACT

Provided are at least two bearings; an outer shaft having a tubular shape and supporting the bearings at an outer circumferential surface; and an inner shaft housed in the outer shaft with one end extending out from one opening part of the outer shaft. The inner shaft includes a male thread part at least at a portion extending out from the outer shaft.

15 Claims, 8 Drawing Sheets

BEARING APPARATUS HAVING INNER SHAFT MALE THREAD PART EXTENDING OUT FROM OUTER SHAFT OPENING TO ATTACH TO DISK DRIVE BASE

CROSS-REFERENCE TO RELATED APPLICATIONS

This application claims the benefit of priority to Japanese Patent Application Number 2022-066947 filed on Apr. 14, 2022. The entire contents of the above-identified application are hereby incorporated by reference.

TECHNICAL FIELD

The disclosure relates to a pivot assembly bearing apparatus and a disk drive apparatus.

BACKGROUND

A hard disk drive (HDD) is a known example of a disk drive apparatus. A disk drive apparatus rotates a magnetic disk at high speeds, allowing for high-speed access to a storage apparatus. When the magnetic disk is rotated at high speeds, noise and windage loss problematically cause an increase in power consumption. In regard to this, a technique is known that reduces windage loss by enclosing a helium gas or another gas with a lower density than air inside the disk drive apparatus. The disk drive apparatus is provided with, inside a housing including a base member and a cover member, a magnetic disk (storage disk), a head stack assembly and an actuator. The head stack assembly interacts with the magnetic disk, and the actuator drives the head stack assembly.

A pivot assembly bearing apparatus is used in the head stack assembly of a disk drive apparatus. A pivot assembly bearing apparatus typically has a configuration including a pair of rolling bearings inserted into a shaft (for example, see US 2019/0348071 A). The pivot assembly bearing apparatus described in US 2019/0348071 A includes a pivot shaft fitted in a pin integrally formed with a base member and a sleeve rotatably attached to the pivot shaft via the bearings. A cover member is placed at the pivot assembly bearing apparatus, and a screw is inserted into the cover member to screw the screw into a pin tip portion. In other words, the pivot assembly bearing apparatus described in US 2019/0348071 A is fitted in the pin formed at the base member and, in this state, attached to the housing via the cover member and the screw.

SUMMARY

Recently, there is a trend of increasing the number of housed magnetic disks in order to increase the capacity of the disk drive apparatus. For the pivot assembly bearing apparatus described in US 2019/0348071 A, for example, increasing the number of housed magnetic disks brings with it a need to increase the length of the pin integrally formed with the base member in the axial direction. This decreases the rigidity of the pin (housing) supporting the pivot assembly bearing apparatus and increases the load acting on the pin, possibly impairing the stable support of the pivot assembly bearing apparatus.

In light of the aforementioned problems, the disclosure has an object of providing a technique allowing a housing to stably support a pivot assembly bearing apparatus.

To solve to abovementioned problems, a pivot assembly bearing apparatus according to the disclosure includes at least two bearings; a first shaft having a tubular shape and supporting the bearings at an outer circumferential surface; and a second shaft housed in the first shaft with one end extending out from one opening part of the first shaft. The second shaft includes a male thread part at least at a portion extending out from the first shaft.

According to the disclosure, the pivot assembly bearing apparatus can be attached to the housing with high rigidity.

DESCRIPTION OF EMBODIMENTS

First, an overview of representative embodiments of the disclosure will be described. In the following description, reference signs in the drawings corresponding to the components of the disclosure are shown in parentheses, as an example.

1. A pivot assembly bearing apparatus (1, 1A, 1B, 1C) according to the present embodiment includes at least two rolling bearings (50), an outer shaft (10) having a tubular shape and supporting the rolling bearings (50) at an outer circumferential surface (11), and an inner shaft (30) housed in the outer shaft (10) with a tip part (32) extending out from one opening part (10a) of the outer shaft (10). The inner shaft (30) includes a male thread part (32a) at least at the tip part (32) extending out from the outer shaft (10).

2. In an aspect of the pivot assembly bearing apparatus (1, 1A, 1B, 1C) according to the present embodiment, the outer shaft (10) includes a protruding part (17) projecting out from an inner circumferential surface (15) such that the protruding part (17) includes an end surface (17a) facing the other opening part (10b) on an opposite side to the one opening part (10a), the inner shaft (30) includes a protruding part (33) projecting out from an outer circumferential surface (31a) such that the protruding part (33) includes an end surface (33a) facing a side of the male thread part (32a), and the outer shaft (10) and the inner shaft (30) are in contact with each other at the end surfaces (17a, 33a) of the protruding part (17) and the protruding part (33).
3. In an aspect of the pivot assembly bearing apparatus (1, 1A, 1B, 1C) according to the present embodiment, the outer shaft (10) and the inner shaft (30) are in contact with each other at the protruding part (17) and the protruding part (33) between the at least two rolling bearings (50) in an axial direction (X).
4. In an aspect of the pivot assembly bearing apparatus (1, 1A, 1B, 1C) according to the present embodiment, a difference between a coefficient of linear expansion of the outer shaft (10) and a coefficient of linear expansion of the inner shaft (30) is within 50%.
5. A disk drive apparatus (100) according to the present embodiment includes the pivot assembly bearing apparatus (1, 1A, 1B, 1C) according to any one of 1 to 4 described above; and a housing (110, 110A, 110B, 110C) housing the pivot assembly bearing apparatus (1, 1A, 1B, 1C). The housing (110, 110A, 110B, 110C) includes a hole (114) engaging with the male thread part (32a).
6. In an aspect of the disk drive apparatus (100) according to the present embodiment, the hole (114) is a blind hole.
7. In an aspect of the disk drive apparatus (100) according to the present embodiment, the housing (110, 110A, 110B, 110C) includes a base member (111), the pivot assembly bearing apparatus (1, 1A, 1B, 1C) being attached to the base member (111) via the male thread part (32a), and at least one cover member (121) attached to the base member (111) and tightly closing, from outside, an internal space (S) housing the pivot assembly bearing apparatus (1, 1A, 1B, 1C), and the internal space (S) is filled with a gas with a lower density than air.
8. In an aspect of the disk drive apparatus (100) according to the present embodiment, the housing (110, 110A, 110B, 110C) is provided with at least nine magnetic disks (130).
9. In an aspect of the disk drive apparatus (100) according to the present embodiment, the inner shaft (30) of the pivot assembly bearing apparatus (1, 1A, 1B, 1C) includes a female thread part (34a) on the other end side, and the at least one cover member (121) is attached to the pivot assembly bearing apparatus (1, 1A, 1B, 1C) via engagement between the female thread part (34a) and a fastening member (B2).
10. In an aspect of the disk drive apparatus (100) according to the present embodiment, a thickness of the housing (110, 110A, 110B, 110C) is larger than 1 inch.

Embodiments of the disclosure will be described below with reference to the drawings. Note that hereinafter, the drawings are schematic drawings and the dimensional relationships, proportions, and the like between elements in the drawings may differ from reality. Among the drawings, parts having mutually different dimensional relationships, proportions, and the like may be included.

First Embodiment

Disk Drive Apparatus

Figure 1:
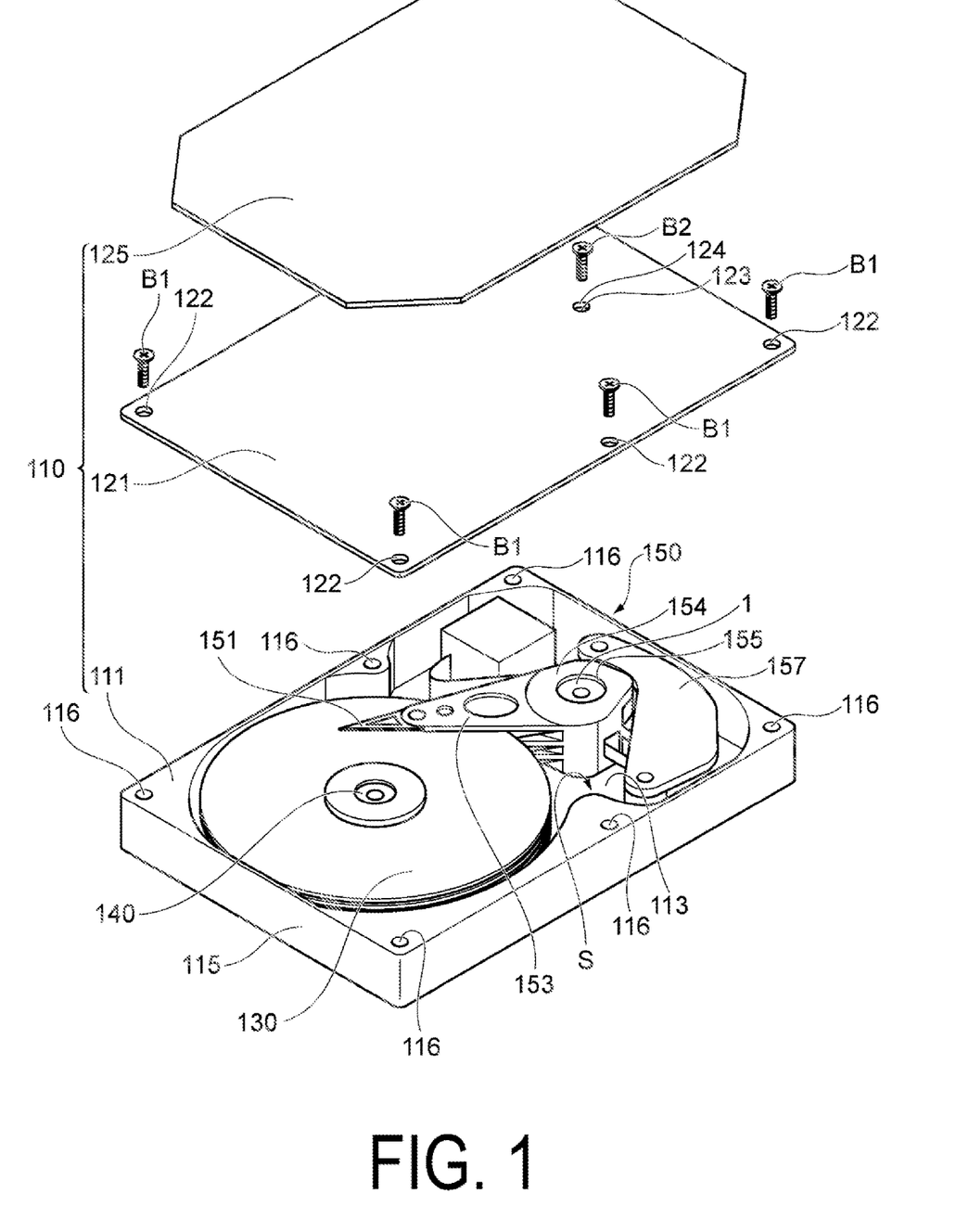
FIG. 1 is an exploded perspective view for describing a disk drive apparatus according to a first embodiment.

FIG. 1 is an exploded perspective view for describing a disk drive apparatus 100 according to the disclosure. The disk drive apparatus 100 according to the first embodiment is a hard disk drive such as a helium-sealed hard disk drive. The disk drive apparatus 100 according to the disclosure includes a pivot assembly bearing apparatus 1 and a housing 110 housing the pivot assembly bearing apparatus 1. The housing 110 includes a hole 114 engaging with the pivot assembly bearing apparatus 1. Specifically, the disk drive apparatus 100 according to the disclosure includes the housing 110, a plurality of magnetic disks 130, and a head stack assembly 150. The specific configuration of the disk drive apparatus 100 will be described below.

Housing

The housing 110 includes a base member 111, an inner cover member 121, and an outer cover member 125. The base member 111 is formed in a rectangular or substantially rectangular shape in a plan view. The base member 111 is made of aluminum, for example, and includes a bottom wall part 113 and a side wall part 115. The bottom wall part 113 and the side wall part 115 define an internal space S housing the magnetic disks 130 and the head stack assembly 150 described below. The base member 111 is open on the side opposite to the bottom wall part 113. In a state with the inner cover member 121 and the outer cover member 125 attached to the base member 111, the internal space S is tightly closed from the outside by the inner cover member 121 and the outer cover member 125 and filled with a gas with a lower density than air such as a helium gas.

The bottom wall part 113 rotatably supports the magnetic disks 130 described below and supports the head stack assembly 150 described below. The bottom wall part 113 includes the hole 114 at the position where the pivot assembly bearing apparatus 1 is supported (see FIG. 5). The hole 114 is formed from the internal space S side toward the outside as a blind hole. Note that the hole 114 may be a through hole. A female thread part 114a is formed at the inner circumferential surface of the hole 114.

The side wall part 115 is an erect portion provided along the peripheral edge of the bottom wall part 113. The side wall part 115 includes a plurality of holes 116. Fastening members B1, such as screws, bolts, or pins, used for attaching the inner cover member 121 described below to the base member 111 are inserted into the holes 116.

The inner cover member 121 is formed in a rectangular plate-like shape and made of aluminum or stainless steel, for example. The inner cover member 121 includes holes 122 and a hole 123. The holes 122 are formed along the peripheral edge part of the inner cover member 121. In a state with the inner cover member 121 attached to the base member 111, the holes 122 of the inner cover member 121 and the holes 116 of the side wall part 115 match with each other, and the fastening members B1 are inserted into the holes 122 and 116. The hole 123 is provided for fixing the inner cover member 121 to the pivot assembly bearing apparatus 1 described below. The hole 123 is formed at a recess part 124.

In a state with the inner cover member 121 fixed to the base member 111, the recess part 124 is formed recessed toward the base member 111. The recess part 124 includes a horizontal part 124a and an inclined part 124b (see FIG. 5). The horizontal part 124a extends from the peripheral edge of the hole 123 in a horizontal direction or a substantially horizontal direction. The horizontal part 124a supports the head part of a fastening member B2, such as a screw, a bolt, or a pin, used for fixing the inner cover member 121 to the pivot assembly bearing apparatus 1. The inclined part 124b extends from the horizontal part 124a at an angle toward the outer cover member 125. The head part of the fastening member B2 is housed inside the recess part 124.

The outer cover member 125 is formed in a rectangular plate-like shape and made of aluminum, for example. The outer cover member 125 is formed with planar dimensions sufficient to cover the inner cover member 121. The outer cover member 125 is welded to the inner cover member 121 all around the peripheral edge part of the outer cover member 125. Accordingly, the internal space S of the housing 110 is sealed from the outside, and leakage of the contained helium to the outside is suppressed.

Magnetic Disk

In the housing 110, the plurality of magnetic disks 130, preferably nine or more magnetic disks 130, are provided as storage media. A spindle motor 140 is provided on the bottom wall part 113 in the housing 110. The spindle motor 140 supports and rotates the plurality of magnetic disks 130. Each magnetic disk 130 includes a magnetic storage layer at an upper surface and/or a lower surface. Each magnetic disk 130 is coaxially fitted around the spindle motor 140. The magnetic disks 130 are rotated at a predetermined rotation speed by the spindle motor 140. Note that the number of magnetic disks 130 provided in the housing 110 is not particularly limited, and a solitary magnetic disk 130 may be housed in the housing 110.

Head Stack Assembly

The head stack assembly 150 includes a magnetic head 151, a swing arm 153, an actuator 157, and the pivot assembly bearing apparatus 1 according to the disclosure. The magnetic head 151 records data on the magnetic disks 130, reproduces data, and the like. The magnetic head 151 is supported by the swing arm 153 rotatably supported by the pivot assembly bearing apparatus 1 described below. The swing arm 153 is driven by the actuator 157. The swing arm 153 is supported by the pivot assembly bearing apparatus 1 according to the present embodiment allowing the swing arm 153 to swing parallel with the bottom wall part 113 of the base member 111. An installation hole 155 is formed at a base part 154 of the swing arm 153. The pivot assembly bearing apparatus 1 is press-fitted into the installation hole 155.

Pivot Assembly Bearing Apparatus

Figure 2:
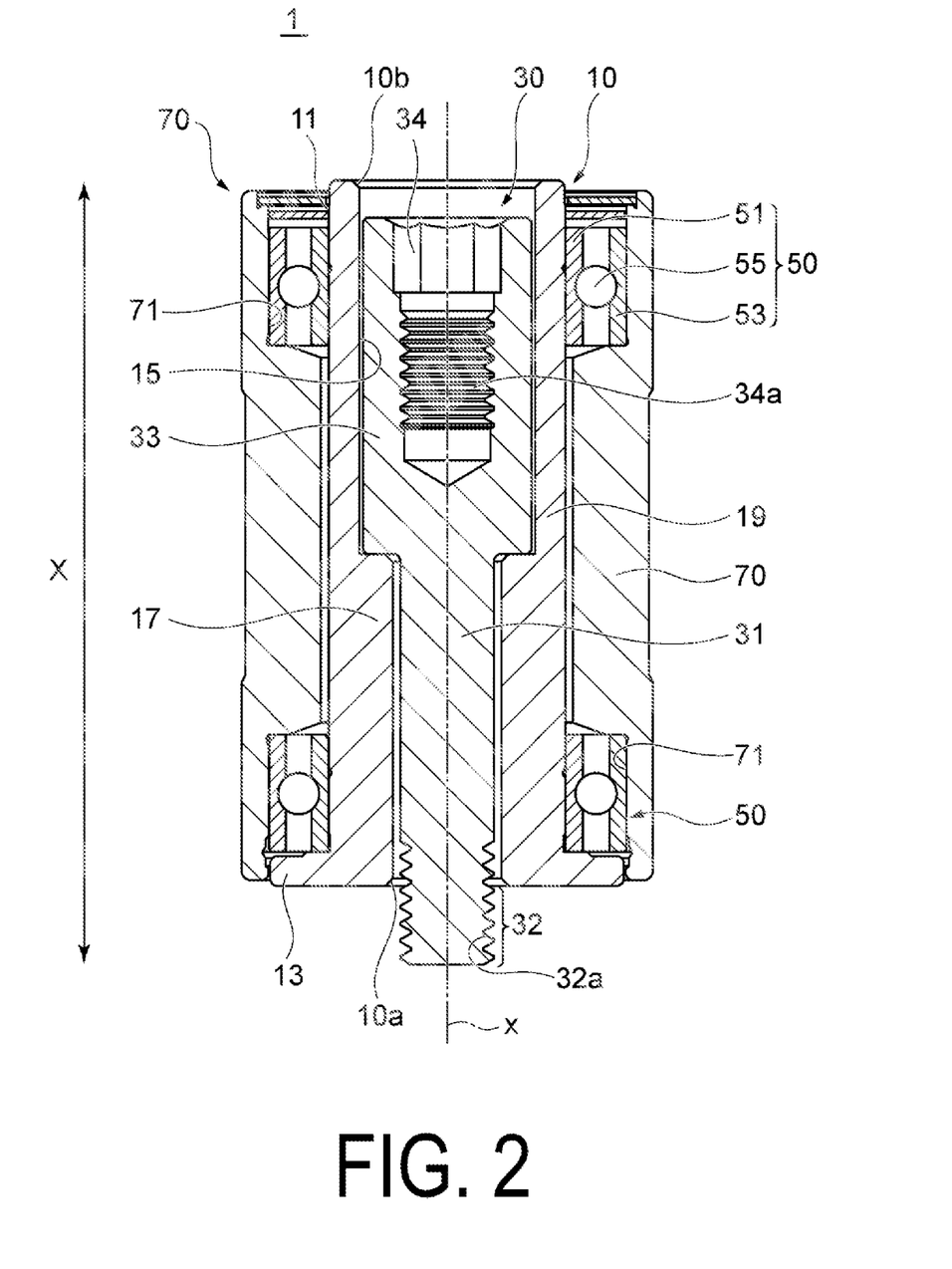
FIG. 2 is a longitudinal sectional view of a pivot assembly bearing apparatus for describing the pivot assembly bearing apparatus according to the first embodiment.

FIG. 2 is a longitudinal sectional view of the pivot assembly bearing apparatus 1 for describing the pivot assembly bearing apparatus 1 according to the first embodiment. The pivot assembly bearing apparatus 1 according to the present embodiment includes two rolling bearings 50, an outer shaft (first shaft) 10 having a tubular shape and supporting the rolling bearings 50 at an outer circumferential surface 11, and an inner shaft (second shaft) 30 housed in the outer shaft 10 with a tip part (one end) 32 extending from one opening part 10a of the outer shaft 10. The inner shaft 30 includes a male thread part 32a at least at the tip part 32 extending out from the outer shaft 10. The pivot assembly bearing apparatus 1 according to the present embodiment includes the outer shaft 10, the inner shaft 30, the pair of rolling bearings 50, and a sleeve 70. The configuration of the pivot assembly bearing apparatus 1 will be specifically described below.

Figure 3:
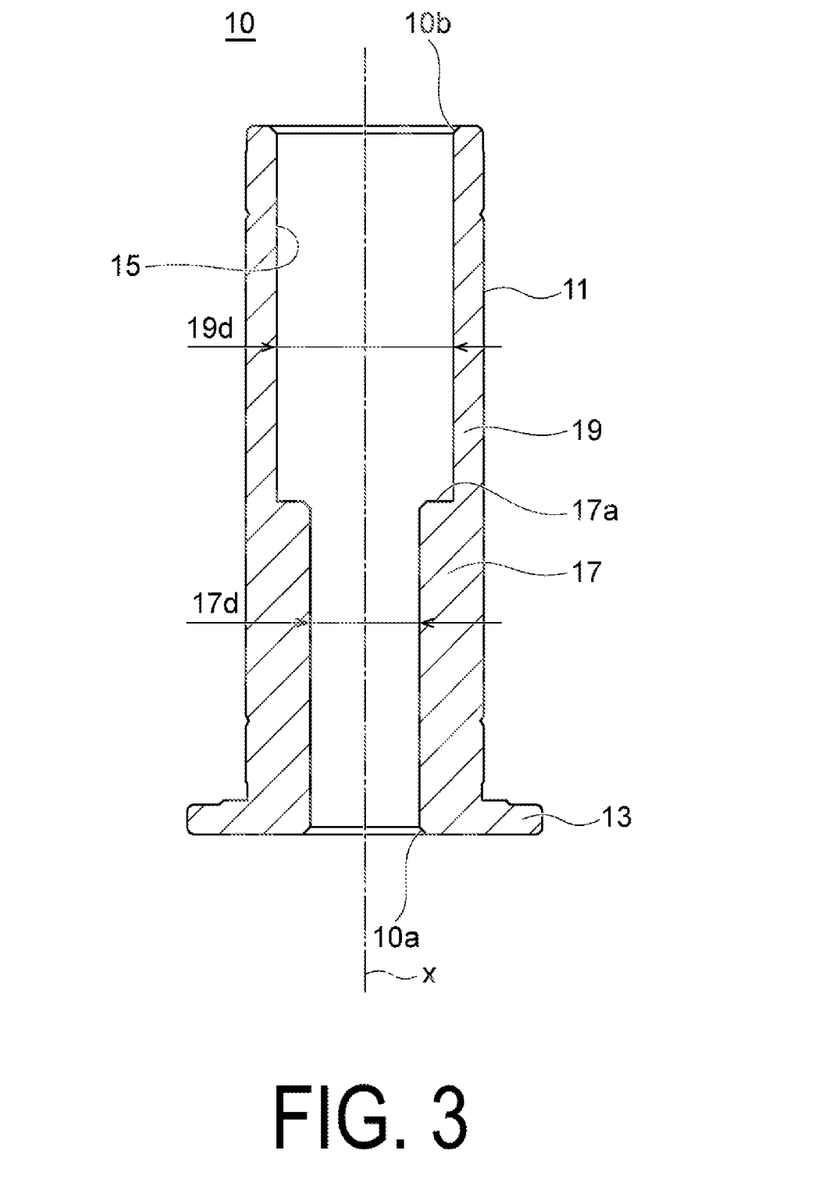
FIG. 3 is a longitudinal sectional view of an outer shaft of the pivot assembly bearing apparatus according to the first embodiment.

FIG. 3 is a longitudinal sectional view of the outer shaft 10 of the pivot assembly bearing apparatus 1 according to the first embodiment. The outer shaft 10 is a member with a tubular shape made of stainless steel (SUS303, SUS304, SUS430F, or the like), for example, and includes opening parts 10a and 10b opening at both ends.

The shape of the outer shaft 10 in a cross-section intersecting an axis x passing through the center of the outer shaft 10 is circular. The inner shaft 30 described below is inserted into the outer shaft 10 from the opening part 10b side toward the opening part 10a side. The outer shaft 10 supports the rolling bearings 50 described below at the outer circumferential surface 11. The outer shaft 10 includes a flange part 13 at the outer circumferential surface 11. The flange part 13 is provided at the end part of the outer shaft 10 on the opening part 10a side and comes into contact with the base member 111 when the pivot assembly bearing apparatus 1 is attached to the base member 111. The flange part 13 extends outside from the outer circumferential surface 11 in the radial direction and is provided around the entire circumference of the outer shaft 10 centered at the axis x.

The outer shaft 10 includes a protruding part (first projection part) 17 on an inner circumferential surface 15 side. The protruding part 17 is an annular portion provided along the entire circumference protruding out from the inner circumferential surface 15 toward the axis x. The protruding part 17 extends toward the opening part 10a side from a position midway or substantially midway along the outer shaft 10 along the axis x. The protruding part 17 is formed in an annular shape following the circumferential direction at the inner circumferential surface 15. A housing part 19 housing a protruding part 33 of the inner shaft 30 described below is provided on the opening part 10b side of the protruding part 17.

An inner diameter 17d of the protruding part 17 of the outer shaft 10 is smaller than an inner diameter 19d of the housing part 19. The outer shaft 10 houses a body part 31 of the inner shaft 30 described below at the protruding part 17. The inner diameter 17d of the protruding part 17 is slightly larger than an outer diameter 31D of the body part 31 of the inner shaft 30. The wall thickness of the protruding part 17 of the outer shaft 10 is larger than the wall thickness of the housing part 19.

The protruding part 17 includes an end surface 17a facing the other opening part 10b on the opposite side to the opening part 10a. The end surface 17a is the surface of a level difference formed by the difference between the inner diameter 17d of the protruding part 17 of the outer shaft 10 and the inner diameter 19d of the housing part 19 of the outer shaft 10. The end surface 17a extends around the entire circumference of the inner circumferential surface 15 centered at the axis x. Note that a plurality of the protruding parts 17 extending following the axis x may be provided at the inner circumferential surface 15 at predetermined intervals in the circumferential direction. The protruding part 17 comes into contact with the inner shaft 30 described below at the end surface 17a.

The housing part 19 is located on the opening part 10b side of the protruding part 17 and houses the protruding part 33 of the inner shaft 30. The inner diameter 19d of the housing part 19 of the outer shaft 10 is slightly larger than an outer diameter 33D of the protruding part 33 of the inner shaft 30.

Figure 4:
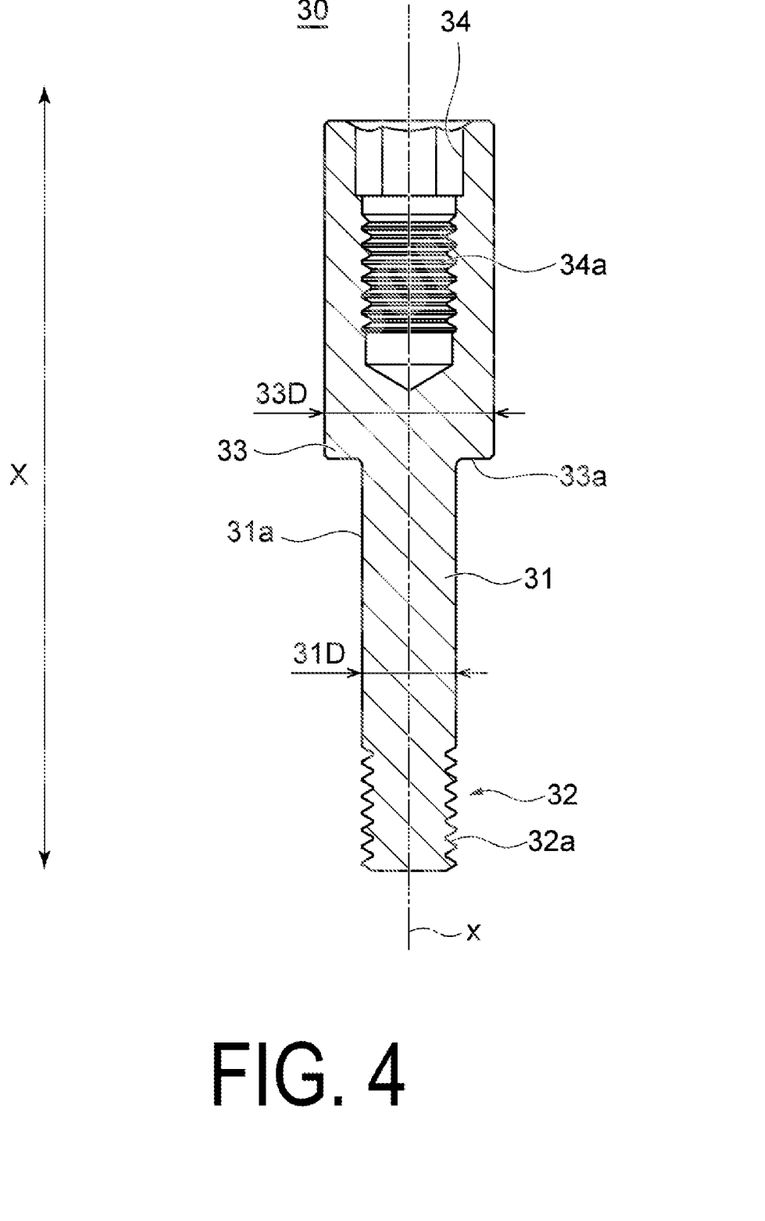
FIG. 4 is a longitudinal sectional view of an inner shaft of the pivot assembly bearing apparatus according to the first embodiment.

FIG. 4 is a longitudinal sectional view of the inner shaft 30 of the pivot assembly bearing apparatus 1 according to the first embodiment. The inner shaft 30 is a member with a rod-like shape made of stainless steel (SUS303, SUS304, SUS430F, or the like), for example. The inner shaft 30 is housed in the outer shaft 10 coaxially or substantially coaxially with the axis x. The shape of the inner shaft 30 in a cross-section intersecting the axis x is circular.

The inner shaft 30 includes the body part 31 and the protruding part (second projection part) 33. The outer diameter 31D of the body part 31 is smaller than the outer diameter 33D of the protruding part 33, and the body part 31 is inserted into the outer shaft 10 at the protruding part 17 of the outer shaft 10. In a state with the inner shaft 30 housed in the outer shaft 10 (hereinafter also referred to as a housed state), the tip part 32 of the body part 31 extends out from the opening part 10a of the outer shaft 10. The tip part 32 is at least a portion exposed from the outer shaft 10, and the male thread part 32a is formed at the outer circumferential surface of the tip part 32. In the housed state, the male thread part 32a at least partially overlaps the inner circumferential surface 15 of the outer shaft 10 at the protruding part 17 in a direction aligned with the axis x (hereinafter also referred to as an axial direction X). The male thread part 32a engages with the female thread part 114a of the hole 114 formed in the bottom wall part 113 of the base member 111.

The protruding part 33 is a portion projecting outward in the radial direction around the entire circumference of an outer circumferential surface 31a of the body part 31 and is a portion with a larger diameter than the body part 31. The protruding part 33 is housed in the housing part 19 of the outer shaft 10 in the housed state. In the housed state, the inner shaft 30 is in contact with the protruding part 17 of the outer shaft 10 at the protruding part 33 and is supported from the tip part 32 side in the axial direction X.

The protruding part 33 includes an end surface 33a facing the male thread part 32a side of the tip part 32 and facing the opening part 10a of the outer shaft 10 in the housed state. The end surface 33a is the surface of a level difference formed by the difference between the outer diameter 33D of the protruding part 33 of the inner shaft 30 and the outer diameter 31D of the body part 31 of the inner shaft 30. The end surface 33a extends around the entire circumference centered at the axis x. In the housed state, the end surface 33a of the inner shaft 30 is in contact with the end surface 17a of the outer shaft 10 in the axial direction X. The position of contact between the outer shaft 10 and the inner shaft 30 is between the pair of rolling bearings 50 described below in the axial direction X and is a position not overlapping the rolling bearings 50 in the axial direction X. Note that a plurality of the protruding parts 33 extending following the axis x may be provided at predetermined intervals in the circumferential direction.

The protruding part 33 includes a blind hole 34. The blind hole 34 extends from the side opposite to the tip part 32 following the axis x toward the tip part 32. A female thread part 34a is formed at the inner circumferential surface of the blind hole 34. The fastening member B2 for fixing the inner cover member 121 to the pivot assembly bearing apparatus 1 engages with the female thread part 34a.

The rolling bearing 50 includes an inner ring 51, an outer ring 53, and a rolling body 55. The rolling bearing 50 is provided between the outer shaft 10 and the sleeve 70 with a tubular shape. The two rolling bearings 50 are attached to the outer shaft 10 with a predetermined interval between the two rolling bearings 50 in the axial direction X. One of the rolling bearings 50 is attached to the outer circumferential surface of the outer shaft 10 on the opening part 10a side, and the other rolling bearing 50 is attached to the outer circumferential surface of the outer shaft 10 on the opening part 10b side.

The inner ring 51 is loosely fitted to the outer shaft 10. An anaerobic adhesive (acrylic adhesive) may be applied to the outer shaft 10 between the inner circumferential surface of the inner ring 51 and the outer circumferential surface of the outer shaft 10. The outer ring 53 is loosely fitted to the sleeve 70. The rolling body 55 is supported between the inner ring 51 and the outer ring 53 in a manner allowing for rolling movement.

When the pivot assembly bearing apparatus 1 is in an assembled state, the sleeve 70 is fitted to the outer circumferential surface 11 of the outer shaft 10 and houses the rolling bearings 50. The sleeve 70 includes two recess parts 71 formed as recesses at the inner circumferential surface. The recess parts 71 extend annularly in the circumferential direction. The recess parts 71 are provided on both end sides in the axial direction X of the sleeve 70. The recess parts 71 house the rolling bearings 50.

Assembling Pivot Assembly Bearing Apparatus and Fixing Pivot Assembly Bearing Apparatus to Housing Next, a process including assembling the pivot assembly bearing apparatus 1 according to the present embodiment and fixing the assembled pivot assembly bearing apparatus 1 to the housing 110 will be described. The sleeve 70 housing the rolling bearings 50 in the recess parts 71 is fitted to the outer shaft 10. Next, the inner shaft 30 is inserted, the body part 31 side first, from the opening part 10b side of the outer shaft 10. The inner shaft 30 is inserted into the outer shaft 10 until the end surface 33a of the protruding part 33 comes into contact with the end surface 17a of the protruding part 17 of the outer shaft 10. This ends the assembly of the pivot assembly bearing apparatus 1.

Figure 5:
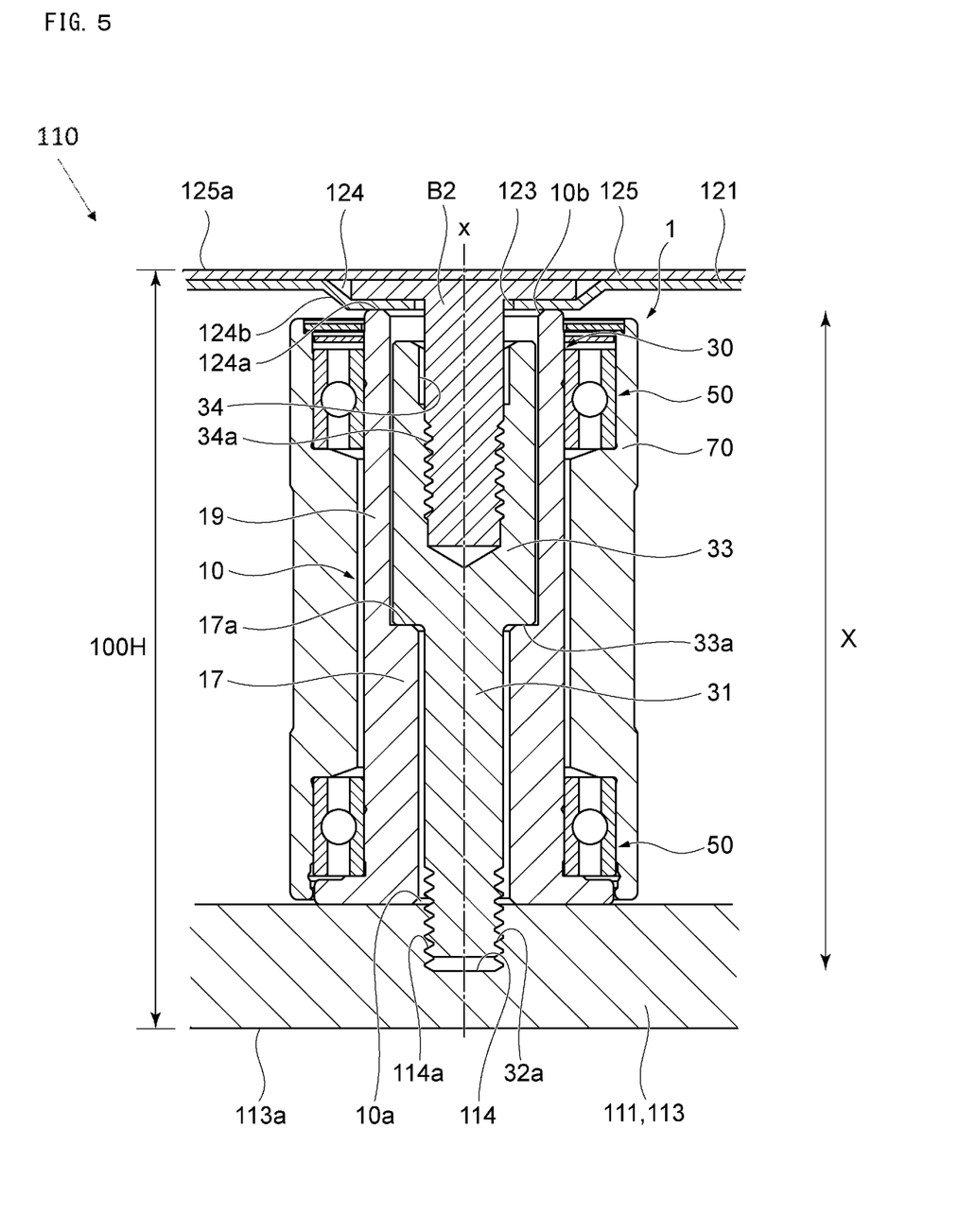
FIG. 5 is a longitudinal sectional view illustrating a state with the pivot assembly bearing apparatus according to the first embodiment fixed to a housing.

FIG. 5 is a longitudinal sectional view illustrating a state with the pivot assembly bearing apparatus 1 according to the first embodiment fixed to the housing 110. The assembled pivot assembly bearing apparatus 1 is fixed to the housing 110. The pivot assembly bearing apparatus 1 is brought closer to the hole 114 formed in the bottom wall part 113 of the base member 111. In the housed state, the tip part 32 of the inner shaft 30 of the pivot assembly bearing apparatus 1 projects out from the outer shaft 10 on the opening part 10a side. The male thread part 32a of the tip part 32 of the inner shaft 30 exposed from the outer shaft 10 is inserted into the hole 114 of the base member 111, and a predetermined tool is used to rotate the inner shaft 30 and screw the inner shaft 30 to the female thread part 114a.

Next, in order to close the internal space S, the inner cover member 121 and the outer cover member 125 are attached to the housing 110. The holes 122 of the inner cover member 121 are matched with the holes 116 in the side wall part 115 of the housing 110, the hole 123 of the inner cover member 121 is matched with the blind hole 34 of the protruding part 33 of the inner shaft 30, the fastening members B1 and B2 are inserted into the holes 122, 116, 123, and 34, and the inner cover member 121 is fixed to the base member 111 and the pivot assembly bearing apparatus 1. Finally, the outer cover member 125 is attached to the inner cover member 121 by welding along the edges.

In the disk drive apparatus 100 according to the present embodiment described above, by screwing the male thread part 32a of the inner shaft 30 into the hole 114 (female thread part 114a) of the base member 111, the pivot assembly bearing apparatus 1 is fixed to the housing 110. Accordingly, the pivot assembly bearing apparatus 1 is fixed to the housing 110 with high rigidity.

Further, the inner shaft 30 comes into contact with the end surface 17a of the protruding part 17 of the outer shaft 10 at the end surface 33a of the protruding part 33, and the outer shaft 10 is pressed against the bottom wall part 113 in the axial direction X. In this manner, the pivot assembly bearing apparatus 1 can be fixed to the housing 110 with even higher rigidity.

Also, since the outer shaft 10 and the inner shaft 30 come into contact between the two rolling bearings 50 in the axial direction X, the stress from the contact between the outer shaft 10 and the inner shaft 30 acting on the rolling bearings 50 can be inhibited. Thus, the rotational accuracy of the rolling bearings 50 can be ensured.

Further, the pivot assembly bearing apparatus 1 is also fixed to the housing 110 by the fastening member B2 on the inner cover member 121 side. In other words, the pivot assembly bearing apparatus 1 is fixed to the housing 110 at two locations, the base member 111 and the inner cover member 121. In this state, the inner cover member 121 comes into contact with the end surface of the outer shaft 10 on the opening part 10b side at the horizontal part 124a of the recess part 124. By screwing the fastening member B2 to the female thread part 34a of the inner shaft 30, the inner shaft 30 and the outer shaft 10 are pressed toward the bottom wall part 113 of the base member 111 and the outer shaft 10 is pressed toward the bottom wall part 113 of the base member 111 via the inner cover member 121. In this manner, the pivot assembly bearing apparatus 1 can be fixed to the housing 110 with even high rigidity.

Further, since the outer shaft 10 and the inner shaft 30 are made of stainless steel, the difference in the coefficient of linear expansion between the two can be reduced. For example, the difference between the coefficient of linear expansion of the outer shaft 10 and the coefficient of linear expansion of the inner shaft 30 is preferably within 50%. Accordingly, the difference in the change in volume between the outer shaft 10 and the inner shaft 30 when the disk drive apparatus 100 is driven can be reduced, and a change in the rigidity of the fixing of the pivot assembly bearing apparatus 1 and the housing 110 can be inhibited. Note that the outer shaft 10 and the inner shaft 30 may be made of different materials as long as the difference in the coefficient of linear expansion is within 50%, but the same material is preferably used.

Further, the hole 114 formed in the bottom wall part 113 of the base member 111 where the tip part 32 of the inner shaft 30 is inserted is formed as a blind hole. This can prevent the helium contained in the internal space S from leaking to the outside of the housing 110 via the hole 114.

Also, the male thread part 32a of the tip part 32 of the inner shaft 30 is formed across the entire area of the tip part 32 exposed from the outer shaft 10. Thus, the fastening force from the screwing can be ensured from the position of contact between the outer shaft 10 and the base member 111. Accordingly, no consideration needs to be given to a non-engagement portion between a clearance portion (a portion without the male thread part 32a) formed when the male thread part 32a is formed at the body part 31 and the female thread part 114a of the hole 114. Thus, the proportion of the hole 114 relative to the thickness (thickness in the axial direction X) of the bottom wall part 113 of the base member 111 can be reduced. Also, since the interval between the hole 114 and an outer surface 113a of the bottom wall part 113 is increased, for example, a gas such as a helium gas with very small molecules contained in the internal space S can be inhibited from leaking out from the internal space S via casting cavities formed in some cases when the base member 111 is manufactured.

Further, the thickness of the disk drive apparatus 100 is larger than 1 inch, for example. Here, the thickness of the disk drive apparatus 100 means the thickness of the housing 110 and corresponds to a height 100H in the axial direction X of the pivot assembly bearing apparatus 1 between the outer surface 113a of the bottom wall part 113 of the base member 111 of the housing 110 and an outer surface 125a of the outer cover member 125 (see FIG. 5). In the pivot assembly bearing apparatus 1 according to the present embodiment, the inner shaft 30 is configured as a separate body to the housing 110, and the pivot assembly bearing apparatus 1 is fixed to the housing 110 via the inner shaft 30. Accordingly, even when the disk drive apparatus 100 has a large capacity and includes nine or more magnetic disks 130 accordingly, and the thickness of the housing 110 is larger than 1 or 2 inches, the pivot assembly bearing apparatus 1 can be fixed to the housing 110 stably and with high rigidity.

Next, other embodiments will be described with reference to FIGS. 6 to 8. The same components as the components in the first embodiment are given the same reference signs and are not described.

Second Embodiment

Figure 6:
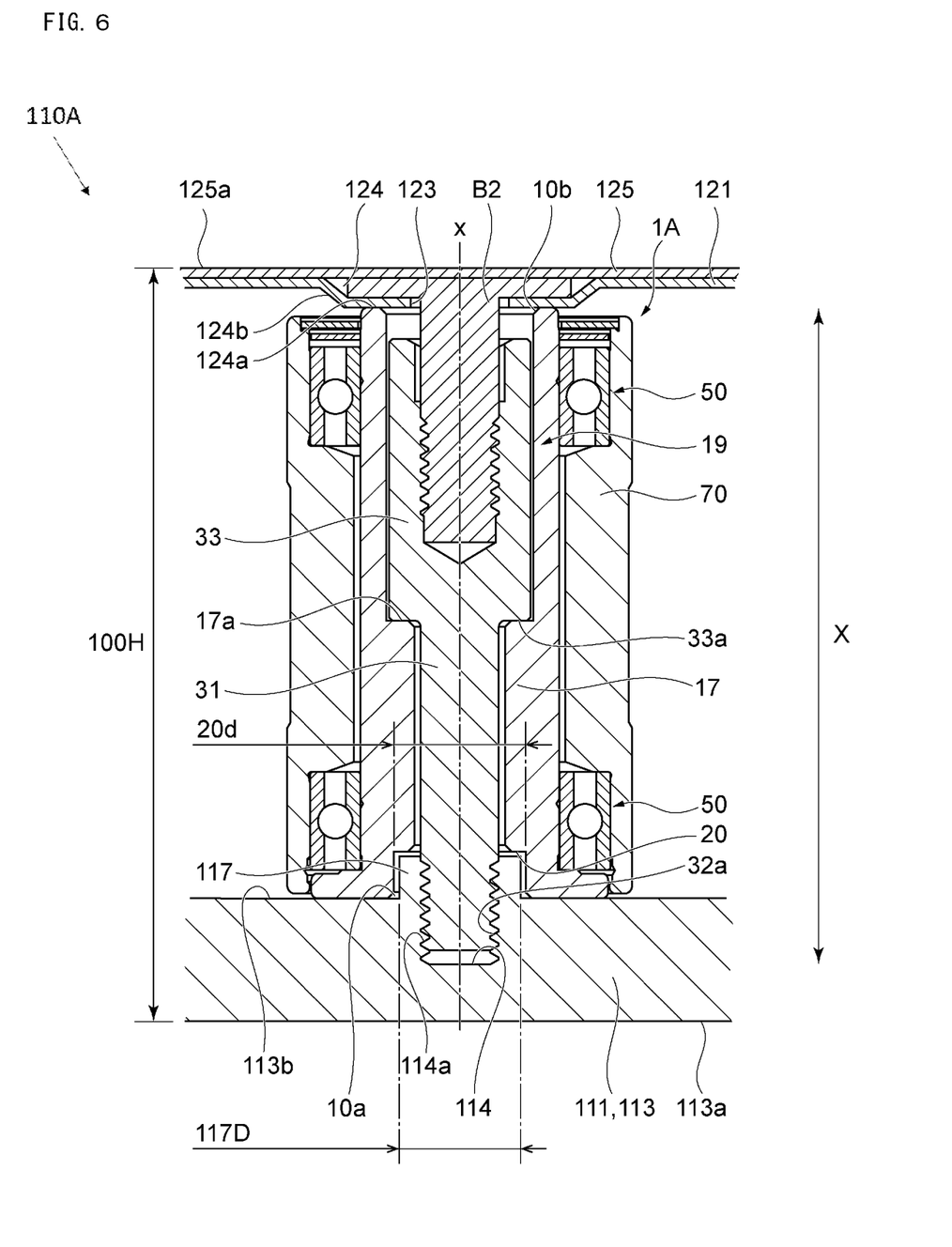
FIG. 6 is a longitudinal sectional view illustrating a state with a pivot assembly bearing apparatus according to a second embodiment fixed to a base member.

FIG. 6 is a longitudinal sectional view illustrating a state with a pivot assembly bearing apparatus 1A according to the second embodiment fixed to the base member 111. The disk drive apparatus according to the second embodiment includes the pivot assembly bearing apparatus 1A and the base member 111. The pivot assembly bearing apparatus 1A is fixed to the base member 111.

The bottom wall part 113 of the base member 111 includes a protruding part 117 at the position where the pivot assembly bearing apparatus 1A is supported. The protruding part 117 is formed protruding toward the pivot assembly bearing apparatus 1A from an inner surface 113b of the bottom wall part 113. The protruding part 117 is formed in a circular shape in a plan view. In a state with the pivot assembly bearing apparatus 1A fixed to the bottom wall part 113 of the base member 111, the protruding part 117 enters into a recess part 20 of the outer shaft 10 described below.

The hole 114 is formed in the protruding part 117. The hole 114 is formed concentrically or substantially concentrically with the protruding part 117. The hole 114 is formed, as a blind hole, from the inner surface 113b side toward the outer surface 113a side. Note that the hole 114 may be a through hole. The female thread part 114a is formed at the inner circumferential surface of the hole 114.

The pivot assembly bearing apparatus 1A includes the outer shaft 10, the inner shaft 30, the pair of rolling bearings 50, and the sleeve 70. The outer shaft 10 includes the recess part 20 at the protruding part 17 on the opening part 10a side. The recess part 20 is formed recessed following the axis x on the opening part 10a side and is formed concentrically or substantially concentrically with the axis x. The recess part 20 is formed in a circular shape in a plan view, and an inner diameter 20d is slightly larger than an outer diameter 117D of the protruding part 117.

The disk drive apparatus according to the second embodiment has effects similar to the effects of the disk drive apparatus 100 according to the first embodiment. Since the base member 111 includes the protruding part 117 and the pivot assembly bearing apparatus 1A includes the recess part 20 at the outer shaft 10, the protruding part 117 is inserted into the recess part 20 when the pivot assembly bearing apparatus 1A is fixed to the base member 111, allowing the pivot assembly bearing apparatus 1A to be easily positioned relative to the base member 111.

Further, since the hole 114 is formed in the protruding part 117 of the base member 111, the starting end position of the hole 114 can be higher by a length corresponding to the length the protruding part 117 projects from the inner surface 113b of the bottom wall part 113. That is, a larger interval can be created between the hole 114 and the outer surface 113a of the bottom wall part 113, and the helium contained in the internal space S can be reliably inhibited from leaking out via the hole 114.

Third Embodiment

Figure 7:
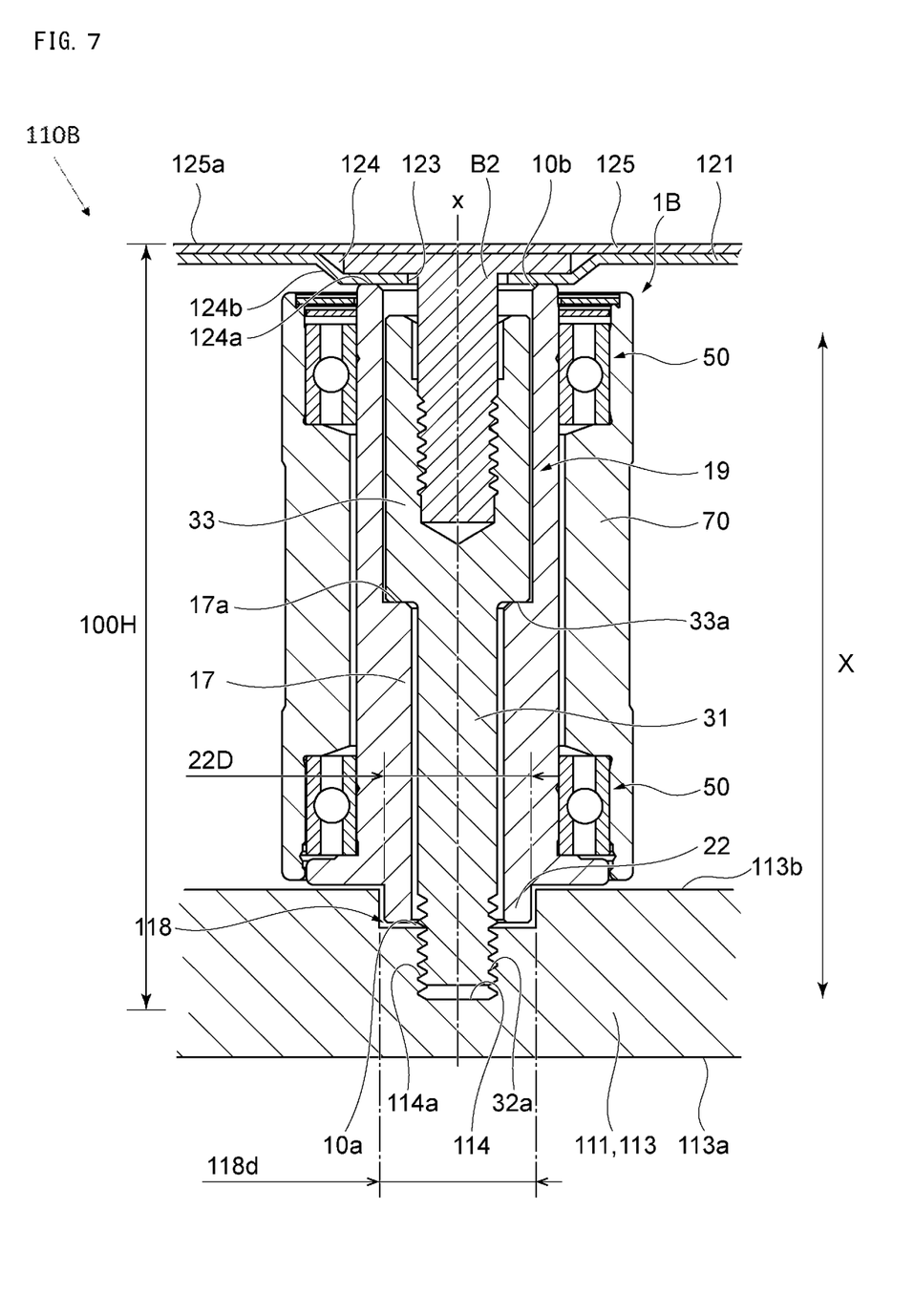
FIG. 7 is a longitudinal sectional view illustrating a state with a pivot assembly bearing apparatus according to a third embodiment fixed to a base member.

FIG. 7 is a longitudinal sectional view illustrating a state with a pivot assembly bearing apparatus 1B according to the third embodiment fixed to the base member 111. The disk drive apparatus according to the third embodiment includes the pivot assembly bearing apparatus 1B and the base member 111. The pivot assembly bearing apparatus 1B is fixed to the base member 111.

The bottom wall part 113 of the base member 111 includes a recess part 118 at the position where the pivot assembly bearing apparatus 1B is supported. The recess part 118 is formed recessed toward the outer surface 113a from an inner surface 113b of the bottom wall part 113. The recess part 118 is formed in a circular shape in a plan view. In a state with the pivot assembly bearing apparatus 1B fixed to the base member 111, a protruding part 22 of the outer shaft 10 described below enters into the recess part 118.

The hole 114 is formed in the recess part 118. The hole 114 is formed concentrically or substantially concentrically with the recess part 118. The hole 114 is formed, as a blind hole, from the inner surface 113b side toward the outer surface 113a side. Note that the hole 114 may be a through hole. A female thread part 114a is formed at the inner circumferential surface of the hole 114.

The pivot assembly bearing apparatus 1B includes the outer shaft 10, the inner shaft 30, the pair of rolling bearings 50, and the sleeve 70. The outer shaft 10 includes the protruding part 22 at the protruding part 17 on the opening part 10a side. The protruding part 22 is formed protruding toward the opening part 10a side and is formed concentrically or substantially concentrically with the axis x. The protruding part 22 is formed in a circular shape in a plan view, and an outer diameter 22D is slightly smaller than an inner diameter 118d of the recess part 118.

The disk drive apparatus according to the third embodiment has effects similar to the effects of the disk drive apparatus 100 according to the first embodiment. Since the base member 111 includes the recess part 118 and the pivot assembly bearing apparatus 1B includes the protruding part 22 at the outer shaft 10, the protruding part 22 is inserted into the recess part 118 when the pivot assembly bearing apparatus 1B is fixed to the base member 111, allowing the pivot assembly bearing apparatus 1B to be easily positioned relative to the base member 111.

Fourth Embodiment

Figure 8:
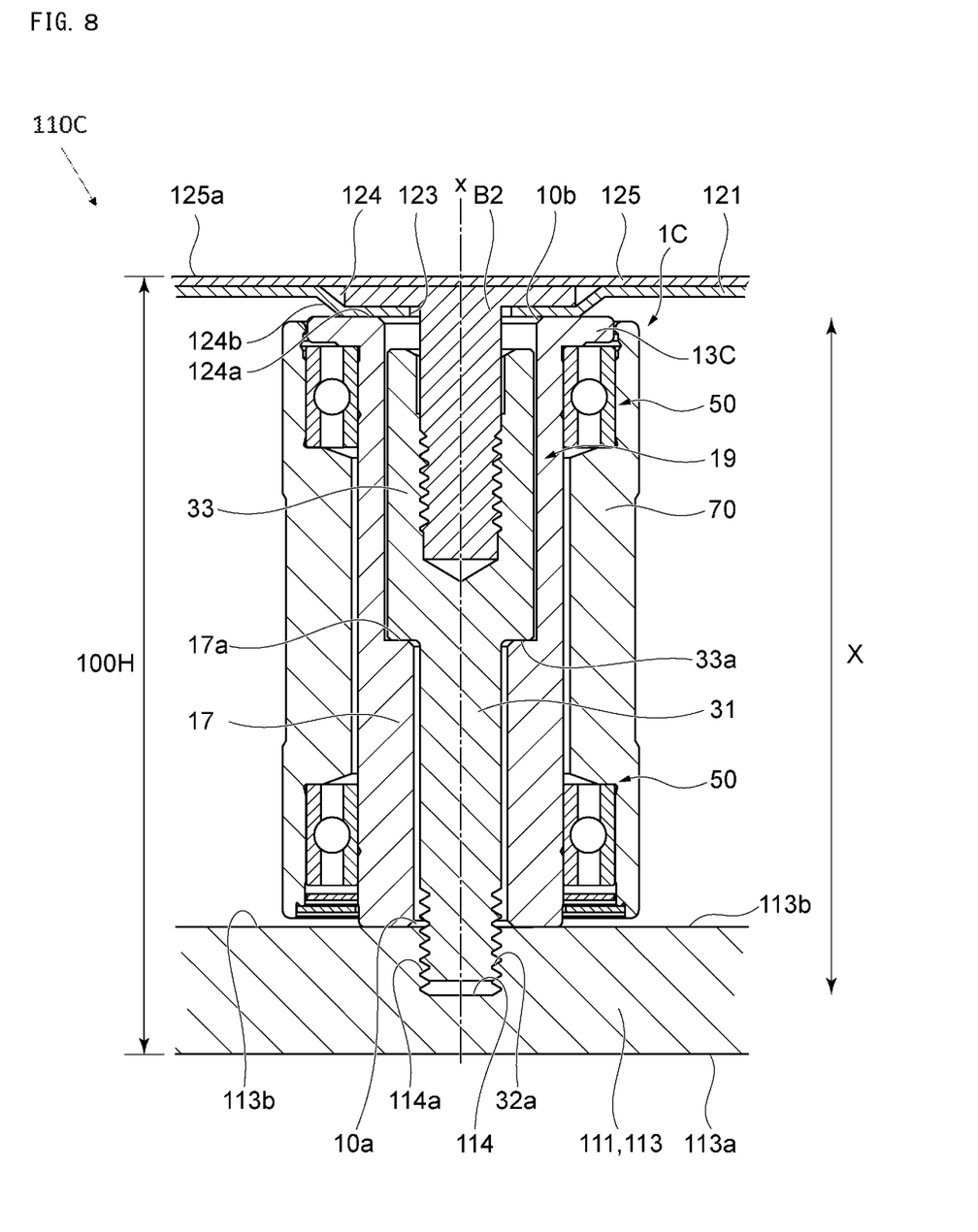
FIG. 8 is a longitudinal sectional view illustrating a state with a pivot assembly bearing apparatus according to a fourth embodiment fixed to a base member.

FIG. 8 is a longitudinal sectional view illustrating a state with a pivot assembly bearing apparatus 1C according to the fourth embodiment fixed to the base member 111. The disk drive apparatus according to the fourth embodiment includes the pivot assembly bearing apparatus 1C and the base member 111. The pivot assembly bearing apparatus 1C is fixed to the base member 111.

The pivot assembly bearing apparatus 1C includes the outer shaft 10, the inner shaft 30, the pair of rolling bearings 50, and the sleeve 70. The outer shaft 10 includes a flange part 13C on the opening part 10b side.

The disk drive apparatus according to the fourth embodiment has effects similar to the effects of the disk drive apparatus 100 according to the first embodiment. Further, since the outer shaft 10 includes the flange part 13C on the opening part 10b side, the horizontal part 124a of the inner cover member 121 is placed on the flange part 13C. Accordingly, for example, compared to the contact area between the end surface of the outer shaft 10 on the opening part 10b side and the inner cover member 121 according to the first to third embodiments, a large contact area with the inner cover member 121 can be ensured at the flange part 13C, allowing the inner cover member 121 to stably press the outer shaft 10 against the base member 111.

Other

The preferred embodiments of the disclosure have been described above; however, the disclosure is not limited to the embodiments described above and includes various aspects included in concepts and claims of the disclosure. Further, the configurations may be selectively combined as appropriate so as to achieve at least part of the problems and the effects described above. Also, for example, a shape, a material, an arrangement, a size, and the like of each of the components in the embodiment described above may be changed as appropriate according to a specific usage aspect of the disclosure. For example, in the embodiments described above, the two rolling bearings 50 are provided. However, three or more rolling bearings 50 may be provided. In this case, it is sufficient that the position of contact between the outer shaft 10 and the inner shaft 30 is between the outermost two rolling bearings 50 in the axial direction X, but preferably, the rolling bearings 50 do not overlap in a radial-direction view.

Further, the disk drive apparatus 100 according to the embodiments described above is a helium-filled disk drive apparatus, but the internal space S does not need to be filled with helium.

Also, the thickness of the disk drive apparatus 100 or the housing 110 according to the embodiments described above is larger than 1 inch, but the thickness of the disk drive apparatus 100 and the thickness of the housing 110 are not particularly limited. For example, the configuration of the disk drive apparatus 100 according to the embodiments described above can be applied to a disk drive apparatus with a thickness of 1 inch or less.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A bearing apparatus comprising:
   at least two bearings;
   a first shaft having a tubular shape and supporting the bearings at an outer circumferential surface; and
   a second shaft housed in the first shaft with one end extending out from one opening part of the first shaft, wherein
   the second shaft includes a male thread part at least at a portion extending out from the first shaft,
   the first shaft includes a first projection part projecting out from an inner circumferential surface such that the first projection part includes an end surface facing an other opening part on an opposite side to the one opening part, the second shaft includes a second projection part projecting out from an outer circumferential surface such that the second projection part includes an end surface facing a side of the male thread part, and the first shaft and the second shaft are in contact with each other at the end surfaces of the first projection part and the second projection part, wherein the first shaft and the second shaft are in contact with each other at the first projection part and the second projection part between the at least two bearings in an axial direction.

2. The bearing apparatus according to claim 1, wherein a difference between a coefficient of linear expansion of the first shaft and a coefficient of linear expansion of the second shaft is within 50%.

3. The bearing apparatus according to claim 1, wherein
the first shaft includes a protruding part at the first projection part on the one opening part side,
the protruding part is formed protruding in an axial direction and is formed concentrically or substantially concentrically with an axis passing through the center of the first shaft.

4. A disk drive apparatus comprising:
the bearing apparatus according to claim 3; and
a housing housing the bearing apparatus, wherein
the housing includes
a base member, the bearing apparatus being attached to the base member via the male thread part, and
the base member includes a bottom wall part, the bottom wall part includes a recess part at a position where the bearing apparatus is supported,
the recess part is formed recessed toward an outer surface of the bottom wall part from an inner surface of the bottom wall part,
the recess part includes a hole engaging with the male thread part, and
the protruding part of the first shaft is housed inside the recess part.

5. The bearing apparatus according to claim 1, wherein the first shaft includes a flange part on the other opening part side.

6. A disk drive apparatus comprising:
the bearing apparatus according to claim 5; and
a housing housing the bearing apparatus, wherein
the housing includes a base member, the bearing apparatus being attached to the base member via the male thread part, and
at least one cover member attached to the base member and tightly closing a space housing the bearing apparatus from outside, and
the second shaft of the bearing apparatus includes a female thread part on an other end side, and
the at least one cover member is attached to the bearing apparatus via engagement between the female thread part and a fastening member,
the at least one cover member is placed on the flange part.

7. A disk drive apparatus comprising:
the bearing apparatus according to claim 1;
a spindle motor supporting and rotating a plurality of magnetic disks, and
a housing housing the bearing apparatus, wherein
the housing includes a hole engaging with the male thread part.

8. The disk drive apparatus according to claim 7, wherein the hole is a blind hole.

9. The disk drive apparatus according to claim 7, wherein the housing is provided with at least nine magnetic disks.

10. The disk drive apparatus according to claim 7, wherein a thickness of the housing is larger than 1 inch.

11. The disk drive apparatus according to claim 7, wherein the housing includes
a base member, the bearing apparatus being attached to the base member via the male thread part, and
at least one cover member attached to the base member and tightly closing a space housing the bearing apparatus from outside, and
the space is filled with a gas with a lower density than air.

12. The disk drive apparatus according to claim 11, wherein
the second shaft of the bearing apparatus includes a female thread part on an other end side, and
the at least one cover member is attached to the bearing apparatus via engagement between the female thread part and a fastening member.

13. A bearing apparatus comprising:
at least two bearings;
a first shaft having a tubular shape and supporting the bearings at an outer circumferential surface; and
a second shaft housed in the first shaft with one end extending out from one opening part of the first shaft, wherein
the second shaft includes a male thread part at least at a portion extending out from the first shaft,
wherein the first shaft includes a first projection part projecting out from an inner circumferential surface such that the first projection part includes an end surface facing an other opening part on an opposite side to the one opening part,
the second shaft includes a second projection part projecting out from an outer circumferential surface such that the second projection part includes an end surface facing a side of the male thread part, and
the first shaft and the second shaft are in contact with each other at the end surfaces of the first projection part and the second projection part,
wherein the first shaft includes a recess part at the first projection part on the one opening part side,
the recess part is formed recessed in an axial direction and is formed concentrically or substantially concentrically with an axis passing through the center of the first shaft.

14. A disk drive apparatus comprising:
the bearing apparatus according to claim 13; and
a housing housing the bearing apparatus, wherein
the housing includes
a base member, the bearing apparatus being attached to the base member via the male thread part, and
the base member includes a bottom wall part, the bottom wall part includes a protruding part at a position where the bearing apparatus is supported,
the protruding part is formed protruding toward the bearing apparatus from an inner surface of the bottom wall part,
the protruding part includes a hole engaging with the male thread part, and
the protruding part enters into the recess part of the first shaft.

15. A bearing apparatus comprising:
at least two bearings;
a first shaft having a tubular shape and supporting the bearings at an outer circumferential surface; and
a second shaft housed in the first shaft with one end extending out from one opening part of the first shaft, wherein the second shaft includes a male thread part at least at a portion extending out from the first shaft, wherein the first shaft includes a first projection part projecting out from an inner circumferential surface such that the first projection part includes an end surface facing an other opening part on an opposite side to the one opening part, the second shaft includes a second projection part projecting out from an outer circumferential surface such that the second projection part includes an end surface facing a side of the male thread part, and the first shaft and the second shaft are in contact with each other at the end surfaces of the first projection part and the second projection part, wherein the male thread part at least partially overlaps the first shaft in an axial direction.

* * * * *